3,825,521
MANGANESE AMINE CHELATE CATALYZED
AROMATIC POLYETHER FORMATION
Shinichi Izawa, Tokyo, Kazuhiko Harada, Kanagawa, Ken Mizushiro and Miyoko Ishihara, Tokyo, and Atsuo Nakanishi, Kanagawa, Japan, assignors to Asahi-Dow Limited, Tokyo, Japan
No Drawing. Filed July 25, 1972, Ser. No. 275,102
Claims priority, application Japan, July 31, 1971, 46/57,139, 46/57,140; Aug. 14, 1971, 46/61,419
Int. Cl. C08g 23/18
U.S. Cl. 260—47 ET  28 Claims

ABSTRACT OF THE DISCLOSURE

Aromatic polyethers e.g. poly(2,6-dimethylphenylene-1,4-ether) which are useful as engineering polymers are produced in pure state by oxidative polymerization of a 2,6-disubstituted phenol at 0–100° C. in the presence of a chelate type catalyst comprising at least one of divalent manganese salts and at least one selected amino compound.

BACKGROUND OF THE INVENTION

1. Field of the Invention

This invention relates to improvements in the production of aromatic polyethers by oxidative polymerization of 2,6-disubstituted phenols. More particularly, the invention pertains to processes for producing aromatic polyethers by subjecting 2,6-disubstituted phenols to oxidative polymerization in the presence of a catalyst comprising divalent manganese salts and specific amines defined hereinbelow.

Aromatic polyethers are plastics which are excellent in thermal, mechanical and electrical properties, and in such chemical properties as alkali resistance, acid resistance and hot water resistance.

2. Description of the Prior Art

Aromatic polyethers have been prepared by the oxidative polymerization of 2,6-disubstituted phenols in the presence of a catalyst. Silver oxide, lead dioxide, potassium ferricyanide or ammonium persulfate; or a cuprous salt-tertiary amine complex compound, a cupric salt-alkali-tertiary amine complex compound, a cobalt chelate-transition metal complex compound or a cobalt salt-tertiary amine complex compound have been proposed as catalysts. These prior art processes, however, are deficient in that diphenoquinone is by-produced in appreciable quantities and colors molding products produced from the aromatic polyethers. Accordingly, there are many patents concerning purification processes for removing the diphenoquinone from the polymers. Furthermore, the conventional catalysts lose their activity owing to water by-produced in the course of polymerization.

SUMMARY OF THE INVENTION

An object of the present invention is to provide a novel catalyst for use in the production of aromatic polyethers from 2,6-disubstituted phenols, said catalyst being stable and highly active and not losing its activity even in the presence of water by-produced.

Another object of the invention is to provide a process for producing aromatic polyethers from 2,-6-disubstituted phenols in which diphenoquinone-forming side reactions are entirely inhibited.

A further object of the invention is to provide a process for producing aromatic polyethers of high purity and excellent stability.

According to the present invention, 2,6-disubstituted phenols are polymerized in a medium with a molecular oxygen containing gas in the presence of a catalyst which is chelate compound comprising at least one manganese salt (divalent) and at least one of amino compound having the following three formulas I, II or III:

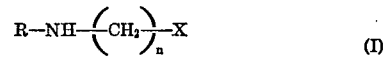

wherein R is an alkyl group having 1 to 4 carbon atoms, a hydroxymethyl group, a β-hydroxyethyl group, a β-hydroxypropyl group or a β-hydroxybutyl group; X is a hydroxyl group, an amino group, an alkylamino group having 1 to 4 carbon atoms, a hydroxymethylamino group, a β-hydroxyethylamino group, a β-hydroxypropylamino group or a β-hydroxybutylamino group; and $n$ is 2 or 3;

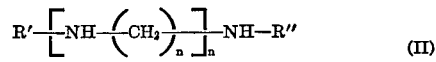

wherein R' and R" are same or different and are individually a hydrogen atom, or R defined above and $n$ and $m$ are individually 2 or 3; or

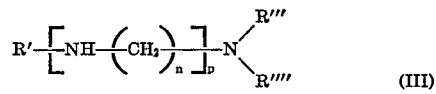

wherein R' is the same as defined above; R''' and R'''' may be same or different, and are the same as R defined above; $n$ is 2 or 3; and $p$ is 1, 2 or 3.

The 2,6-disubstituted phenols used as the starting monomer in the present invention are phenols represented by the general formula,

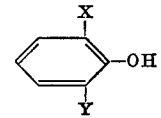

wherein X is a straight chain alkyl group having 1 to 4 carbon atoms; any Y is a halogen atom or an alkyl group having 1 to 4 carbon atoms. Said phenols include, for example, 2,6-dimethylphenol, 2-methyl-6-ethylphenol, 2,6-diethylphenol, 2-methyl - 6 - n-propylphenol, 2-methyl-6-diethylphenol, 2-methyl - 6-bromophenol, 2-methyl-6-isopropylphenol, 2-ethyl-6-n-propylphenol, 2 - methyl-6-n-butylphenol, 2,6 - di-n-propylphenol, 2 - ethyl-6-chlorophenol, 2,6-di-n-butylphenol, 2-n-butyl - 6-chlorophenol, and 2-n-propyl-6-chlorophenol.

Examples of the divalent manganese salt are manganese chloride (II), manganese sulfate (II), manganese bromide (II) manganese acetylacetonate (II), manganese acetate (II), manganese propionate (II), manganese naphthenate (II), manganese sulfide (II), manganese oxalate (II), manganese nitrate (II), manganese carbonate (II), manganese hydrogenphosphate (II), manganese phosphate (II), manganese hydroxide (II), manganese iodide (II), manganese oxide (II), manganese perchlorate (II) and the like organic or inorganic divalent manganese salts.

The amine compounds of the fomula (I) include, for example,
N-methylethanolamine,
N-methylethylenediamine,
N,N'-dimethylethylenediamine,
N-methyl-N' hydroxymethylethylenediamine,
N-methyl-N'-(β-hydroxyethyl)-ethylenediamine,
N-methyl-N'-(β-hydroxypropyl)-ethylenediamine,
N-ethylethanolamine,
N-propylethanolamine,
N-n-butylethanolamine,
diethanolamine,
N,N'-bis(hydroxymethyl)ethylenediamine,
N-methylpropanolamine, N-(β-hydroxyethyl)ethylenediamine,
N-(β-hydroxypropyl)ethylenediamine,
N-(β-hydroxybutyl)ethylenediamine,
N-(β-hydroxyethyl)trimethylenediamine,
N-(β-hydroxypropyl)trimethylenediamine,
N-(β-hydroxybutyl)trimethylenediamine,
N,N'-bis(β-hydroxypropyl) ethylenediamine,
N,N'-bis(β-hydroxypropyl)trimethylenediamine,
N-(β-hydroxypropyl)ethanolamine,
N-hydroxymethyl ethanolamine,
N-ethyl-N'-hydroxymethyl-ethylenediamine,
N-ethyl-N'-(β-hydroxyethyl)ethylenediamine,
N-n-propyl-N'-(β-hydroxyethyl)ethylenediamine,
N-n-butylethylenediamine,
N-n-butylethanolamine,
N-n-butyl-N'-(β-hydroxypropyl)ethylenediamine,
N,N'-dimethylethylenediamine,
N,N'-diethylethylenediamine,
N-n-butyl-N'-(β-hydroxybutyl)ethylenediamine,
N,N'-dimethyltrimethylenediamine, and
N-β-hydroxyethyl-N'β-hydroxypropylethylenediamine.

Examples of the amine compounds of the formula (II) include diethylenetriamine,
triethylenetetramine,
N-(γ-aminopropyl)trimethylenediamine,
N-methyl-diethylenetriamine,
N-methyltriethylenetriamine,
N-ethyl-diethylenetriamine,
N-n-propyl-diethylenetriamine,
N-n-butyl-diethylene-triamine,
N-n-butyl-triethylenetetramine,
N-methyl-N'-(γ-aminopropyl)trimethylenediamine,
N-ethyl-N'-(γ-aminopropyl)trimethylenediamine,
N-n-butyl-N'-(γ-aminopropyl)trimethylenediamine,
N-hydroxymethyl-diethylenetriamine,
N-hydroxymethyl-N'-(γ-aminopropyl)trimethylenediamine,
N-methyl-N'-hydroxymethyl-diethylenetriamine,
N-(β-hydroxyethyl)diethylenetriamine,
N-(β-hydroxypropyl)diethylenetriamine,
N-(β-hydroxybutyl)diethylenetriamine,
N-hydroxymethyl-triethylenetetramine,
N-(β-hydroxyethyl)triethylenetetramine,
N-(β-hydroxypropyl)triethylenetetramine,
N-(β-hydroxybutyl)triethylenetetramine,
N-(β-hydroxethyl)-N'-(γ-aminopropyl)trimethylenediamine,
N-(β-hydroxypropyl)-N'-(γ-aminopropyl)trimethylenediamine,
N-(β-hydroxybutyl)-N'-(γ-aminopropyl)trimethylenediamine,
N-(β-hydroxyethyl)-N'-(γ-ethylaminopropyl)trimethylenediamine,
N-methyl-N'-(β-hydroxyethyl)diethylenetriamine,
N-n-propyl-N'-(β-hydroxyethyl)diethylenetriamine,
N-ethyl-N'-(β-hydroxypropyl)diethylenetriamine,
N-n-butyl-N'-(β-hydroxyethyl)triethylenetetramine, and
N-methyl-N'-(β-hydroxypropyl)triethylenetetramine.

The amino compounds of the formula (III) include, for example,

N,N,N'-trimethyl-ethylenediamine,
N,N,N'-trimethyl-trimethylenediamine,
N,N-dimethyl-N'-hydroxymethyl-ethylenediamine,
N,N-dimethyl-N'-hydroxymethyl-trimethylenediamine,
N,N-dimethyl-N'-β-hydroxyethyl-ethylenediamine,
N,N,-diethyl-N'-β-hydroxyethyl-ethylenediamine,
N,N-diethyl-N'-β-hydroxyethyl-trimethylenediamine,
N,N-dimethyl-N'-β-hydroxypropyl-ethylenediamine,
N,N-diethyl-N'-β-hydroxypropyl-ethylenediamine,
N-methyl-N,N'-bis(hydroxymethyl)ethylenediamine,
N-methyl-N,N-bis(β-hydroxyethyl)ethylenediamine,
N-methyl-N,N'-bis(β-hydroxypropyl)ethylenediamine,
N-methyl-N,N'-bis(β-hydroxybutyl)ethylenediamine,
N-methyl-N,N'-bis(hydroxymethyl)trimethylenediamine,
N-methyl-N,N'-bis(β-hydroxyethyl)trimethylenediamine,
N-methyl-N,N'-bis(β-hydroxypropyl)trimethylenediamine,
N,N-dipropyl-N'-hydroxymethyl-ethylenediamine,
N,N-di-n-butyl-N'-hydroxymethyl-ethylenediamine,
N,N-di-n-butyl-N'-(β-hydroxyethyl)ethylenediamine,
N,N-di-n-butyl-N'-(β-hydroxypropyl)ethylenediamine,
N,N-dipropyl-N'-hydroxymethyl-trimethylenediamine,
N,N-dipropyl-N'-(β-hydroxyethyl)trimethylenediamine,
N,N-di-n-butyl-N'-(β-hydroxypropyl)trimethylenediamine,
N,N'-di-n-butyl-N'-(β-hydroxypropyl)trimethylenediamine,
N,N-dimethylethylenediamine,
N,N-diethylethylenediamine,
N,N-di-n-butyl-ethylenediamine,
N-methyl-N'-(β-hydroxyethyl)ethylenediamine,
N-n-butyl-N'-(β-hydroxyethyl)ethylenediamine,
N,N-dimethyl-trimethylenediamine,
N,N-di-n-butyl-trimethylenediamine,
N,N-bis(β-hydroxyethyl)ethylenediamine,
N,N-bis(β-hydroxypropyl)ethylenediamine,
N,N-bis(β-hydroxyethyl)trimethylenediamine,
N,N-bis(β-hydroxypropyl)trimethylenediamine,
N,N-dimethyl-diethylenetriamine,
N,N-dimethyl-N'-(γ-aminopropyl)trimethylenediamine,
N-methyl-N-(β-hydroxyethyl)-N'-(γ-aminopropyl)trimethylenediamine,
N-(β-hydroxyethyl)-N'-(γ-dimethylaminopropyl)trimethylenediamine,
N,N-dimethyl-N'-(β-hydroxyethyl)diethylenetriamine,
N,N-diethyl-N'-(β-hydroxyethyl)diethylenetriamine,
N,N-dimethyl-N-(β-hydroxypropyl)diethylenetriamine,
N,N-diethyl-N'-(β-hydroxypropyl)diethylenetriamine,
N,N-di-n-butyl-N'-hydroxymethyl-diethylenetriamine,
N,N-di-n-butyl-N'-(β-hydroxyethyl)diethylenetriamine,
N,N-dimethyl-N'-(β-hydroxybutyl)diethylenetriamine,
N-(β-hydroxybutyl)-N'-(γ-di-n-butylaminopropyl)trimethylenediamine,
N,N-dimethyl-triethylenetetramine,
N,N-diethyl-triethylenetetramine,
N,N-di-n-butyl-triethylenetetramine,
N,N,N'-tris-hydroxymethyl-triethylenetetramine,
N,N-dimethyl-N'-(β-hydroxyethyl)triethylenetetramine,
N,N-dimethyl-N'-(β-hydroxypropyl)triethylenetetramine,
N,N-di-n-butyl-N'-(β-hydroxyethyl)triethylenetetramine,
N,N-di-n-propyl-N'-(β-hydroxypropyl)triethylenetetramine,
N-γ-(γ-dimethylamino-propylamino))propyl-trimethylenediamine, and
N-(β-hydroxyethyl)-N'-γ-(γ-dimethylaminopropylamino)propyl-trimethylenediamine.

The present catalysts are in the form of chelate compounds and are prepared by mixing the manganese salt and the amine in a medium. The amount of the manganese salt is in the range from 0.01 to 10 mole percent, preferably from 0.05 to 5 mole percent, based on the amount of the 2,6-disubstituted phenol. The amount of the amine compound is at least equimolar to, preferably from 2 to 60 times the moles of, the manganese salt.

The medium mentioned above may be any solvent so far as it is less susceptible to oxidation than the phenols to be oxidized and is not reactive with various radicals which are considered to be formed during the polymerization. Examples of such solvents include aromatic hydrocarbons such as benzene, toluene, xylene, ethylbenzene and styrene; nitriles such as acetonitrile, propionitrile, benzonitrile and acrylonitrile; alcohols such as methanol, ethanol, propanol, butanol, benzyl alcohol and cyclohexanol; and halogenated hydrocarbons such as chloroform, dichloroethane, trichloroethane, chlorobenzene and dichlorobenzene. These may be used alone or in the form of a mixture thereof. The medium may be in the range from 1 to 100 times, preferably from 2 to 20 times, as much as the weight of the 2,6-disubstituted phenol.

The polymerization is conducted at a temperature of 0°–100° C., preferably 20°–70° C., by passing in the medium an oxidizing agent, preferably oxygen gas. The oxygen may be diluted with an inert gas such as nitrogen or argon. Air may be used in place of the oxygen gas.

Example 1

0.5 Part of manganese nitrate (II) and 6.0 parts of N - methyl - N'-(β-hydroxypropyl)-ethylenediamine were sufficiently stirred together with 60 parts of ethanol, and oxygen gas was continuously flowed vigorously into the resulting mixture. To this mixture was added at a time a solution of 40 parts of 2,6-dimethylphenol in 100 parts of mixed xylenes, and the mixtures was subjected to oxidative polymerization with vigorous stirring. After continuing the reaction for 3 hours, a deposited white precipitate was recovered by filtration. Subsequently, the precipitate was washed with methanol containing a small amount of hydrochloric acid and with methanol in this order, and then dried to obtain poly(2,6-dimethylphenylene-1,4-ether), yield 98%. The intrinsic viscosity $\eta_{sp/c}$ of the thus obtained polymer was 0.82 (measured in a 0.5% solution in chloroform at 25° C.; the same shall apply hereinafter), and the amount of by-produced diphenoquinone in the polymer was 60 p.p.m. (observed the absorption at 420 m$\mu$, using a previously formed calibration; the same shall apply hereinafter).

Example 2

The same reaction as in Example 1 was effected, except that 0.2 part of manganese chloride (II) was used in place of the manganese nitrate (II). After continuing the reaction for 5 hours, a deposited white precipitate was recovered by filtration. Subsequently, the precipitate was treated in the same manner as in Example 1 to obtain poly(2,6-dimethylphenylene-1,4-ether), yield 97%, $\eta_{sp/c}$ 0.69. The amount of diphenoquinone in the polymer was 40 p.p.m.

Example 3

0.3 Part of manganese carbonate (II) and 4.5 parts of N - methyl - N'-(β-hydroxypropyl)-ethylenediamine were dissolved in 10 parts of methanol. To this solution was added a solution of 40 parts of 2,6-dimethylphenol in 150 parts of toluene, and the mixed solution was subjected to oxidative polymerization under stirring while flowing oxygen therein vigorously. After continuing the reaction for 1.5 hours, the reaction liquid was poured into 300 parts of methanol containing a small amount of hydrochloric acid, whereby a polymer was deposited as a white precipitate. Subsequently, the precipitate was washed with methanol and then dried to obtain poly(2,6-dimethylphenylene-1,4-ether), yield 95%, $\eta_{sp/c}$ 0.76. The amount of diphenoquinone in the polymer was 60 p.p.m.

Example 4

1.0 Part of managese sulfate (II) and 10 parts of N-(β-hydroxyethyl)ethylenediamine were sufficiently stirred together with 130 parts of n-butanol, and oxygen gas was continuously flowed vigorously to the resulting mixture. To this mixture was added at a time a solution of 130 parts of 2,6-dimethylphenol in 260 parts of mixed xylenes, and the mixture was subjected to oxidative polymerization with vigorous stirring. After continuing the reaction for 3 hours, a deposited precipitate was recovered by filtration. Subsequently, the precipitate was washed with methanol containing a small amount of hydrochloric acid and with methanol in this order, and then dried to obtain poly(2,6-dimethylphenylene-1,4-ether), yield 98%, $\eta_{sp/c}$ 0.55. The amount of diphenoquinone in the polymer was 100 p.p.m.

Example 5

0.2 Part of manganese hydroxide (II), 1 part of ethanol and 3.5 parts of N-methyl-ethanolamine were sufficiently stirred together with 60 parts of n-butanol, and oxygen gas was continuously flowed vigorously into the resulting mixture. To this mixture was added at a time a solution of 40 parts of 2,6-dimethylphenol in 100 parts of mixed xylenes, and the mixture was subjected to oxidative polymerization with vigorous stirring. After continuing the reaction for 4 hours, a deposited white precipitate was recovered by filtration. Subsequently, the precipitate was washed with methanol containing a small amount of hydrochloric acid and with methanol in this order, and then dried to obtain poly(2,6-dimethylphenyl-1,4-ether), yield 96%, $\eta_{sp/c}$ 0.70. The amount of diphenoquinone in the polymer was 80 p.p.m.

Examples 6–9

Example 1 was repeated, except that each of the 2,6-disubstituted phenols shown in Table 1 and 100 parts of benzene were used. The yields and intrinsic viscosities $\eta_{sp/c}$ of the polymers obtained and the amounts of diphenoquinone in the polymers were as summarized in Table 1.

TABLE 1

| Example | 2,6-disubstituted phenol | Yield, percent | $\eta_{sp/c}$ | Diphenoquinone (p.p.m.) |
|---|---|---|---|---|
| 6 | 2-methyl-6-ethylphenol | 98 | 0.76 | 90 |
| 7 | 2-ethyl-6-chlorophenol | 96 | 0.66 | 30 |
| 8 | 2,6-diethylphenol | 94 | 0.90 | 80 |
| 9 | 2-methyl-6-n-propylphenol | 96 | 0.76 | 60 |

Examples 10–17

Example 1 was repeated, except that the amine compound as the catalyst component was varied as shown in Table 2. The yields and intrinsic viscosities $\eta_{sp/c}$ of the polymers obtained and the amounts of by-produced diphenoquinone were as summarized in Table 2.

TABLE 2

| Example | Amine compound | Yield, percent | $\eta_{sp/c}$ | Diphenoquinone (p.p.m.) |
|---|---|---|---|---|
| 10 | N-(β-hydroxypropyl) ethylenediamine. | 95 | 0.50 | 40 |
| 11 | Diethanolamine | 99 | 0.69 | 60 |
| 12 | N,N'-Bis(β-hydroxypropyl) ethylenediamine. | 98 | 0.95 | 60 |
| 13 | N-(β-hydroxyethyl) ethylenediamine. | 98 | 1.02 | 40 |
| 14 | N-n-butylethanolamine | 94 | 0.80 | 60 |
| 15 | N'-N¹-Bis(β-hydroxyethyl) trimethylenediamine. | 96 | 0.66 | 40 |
| 36 | N-(β-hydroxybutyl)-N'-n-butyl-trimethylenediamine. | 98 | 0.85 | 30 |
| 17 | N-(β-hydroxypropyl)-n-propanolamine. | 97 | 0.77 | 60 |

Example 18

0.4 Part of manganese hydroxide (II) and 2.4 parts of N,N'-dimethyl-N'-(β-hydroxyethyl)ethylenediamine were sufficiently stirred together with 80 parts of ethanol, and oxygen gas was continuously flowed vigorously to the resulting mixture. To this mixture was added a solution of 60 parts of 2,6-dimethylphenol in 160 parts of toluene, and the mixture was subjected to oxidative polymerization with vigorous stirring. After continuing the reaction for 3 hours, a deposited white precipitate was recovered by filtration. Subsequently, the precipitate was washed with methanol containing a small amount of hydrochloric acid and with methanol in this order, and then dried to obtain poly(2,6-dimethylphenylene-1,4-ether), yield 95%, $\eta_{sp/c}$ 0.46. The amount of by-produced diphenoquinone in the polymer was 30 p.p.m.

Example 19

0.5 Part of manganese chloride (II) and 2.0 parts of N,N - dimethyl-N'-(β-hydroxypropyl)ethylenediamine were sufficiently stirred together with 60 parts of methanol, and oxygen gas was continuously flowed vigorously into the resulting mixture. To this mixture was added at a time a solution of 40 parts of 2,6-dimethylpenol in 120 parts of xylene, and the mixture was subjected to oxidative polymerization with vigorous stirring. After continuing the reaction for 5 hours, a deposited white precipitate was recovered by filtration. Subsequently, the precipitate was washed with methanol containing a small amount of hydrochloric acid and with methanol in this order, and then dried to obtain poly(2,6-dimethylphenylene-1,4-ether), yield 94%, $\eta_{sp/c}$ 0.68. The amount of diphenoquinone in the polymer was 30 p.p.m.

Example 20

0.4 Part of manganese acetate (II) and 1.5 parts of N,N-diethyl - N'- (β-hydroxypropyl)trimethylenediamine were sufficiently stirred together with 40 parts of n-propanol, and oxygen gas was continuously flowed vigorously into the resulting mixture. To this mixture was added at a time a solution of 30 parts of 2,6-dimethylphenol in 80 parts of xylene, and the mixture was subjected to oxidative polymerization with vigorous stirring. After continuing the reaction for 2 hours, a deposited white precipitate was recovered by filtration. Subsequently, the precipitate was washed with methanol containing a small amount of hydrochloric acid and with methanol and then dried to obtain poly(2,6-dimethylphenylene-1,4-ether), yield 94%, $\eta_{sp/c}$ 0.52. The amount of by-produced diphenoquinone in the polymer was 60 p.p.m.

Example 21

Into a mixture comprising 350 parts of toluene, 50 parts of n-butanol, 2 parts of manganese acetate (II) and 10.5 parts of N,N-di-n-butyl-N'-(β-hydroxyethyl)ethylenediamine, oxygen gas was continuously flowed vigorously, while stirring the mixture at room temperature. To this mixture was added 100 parts of 2,6-dimethylphenol, and the mixture was subjected to oxidative polymerization for 3 hours. After the reaction, the reaction liquid was diluted with 500 parts of toluene and then poured into 2,000 parts of methanol containing a small amount of hydrochloric acid to deposit a white precipitate. Subsequently, the precipitate was sufficiently washed and then dried to obtain poly(2,6-dimethylphenylene-1,4-ether), yield 93%, $\eta_{sp/c}$ 0.79. The amount of diphenoquinone in the polymer was 40 p.p.m.

Example 22

Into a mixture 250 parts of toluene, 150 parts of methanol, 2 parts of manganese acetate (II) and 11 parts of N,N - di - n-butyl-N'-(β-hydroxypropyl)ethylenediamine, oxygen gas was continuously flowed vigorously, while stirring the mixture at room temperature. To this mixture was added 100 parts of 2,6-dimethylphenol, and the mixture was subjected to oxidative polymerization for 2 hours. After the reaction, a deposited white precipitate was recovered by filtration. Subsequently, the precipitate was thoroughly washed with methanol containing a small amount of hydrochloric acid and with methanol in this order and then dried to obtain poly(2,6-dimethylphenylene-1,4-ether), yield 97%, $\eta_{sp/c}$ 0.66. The amount of diphenoquinone in the polymer was 40 p.p.m.

Example 23

0.6 Part of manganese phosphate (II) and 2.0 parts of N,N-dimethyl-diethylenetriamine were sufficiently stirred together with 50 parts of n-propanol, and oxygen was continuously flowed vigorously into the resulting mixture. To this mixture was added at a time a solution of 40 parts of 2,6-dimethylphenol in 110 parts of toluene, and the mixture was subjected to oxidative polymerization with vigorous stirring. After continuing the reaction for 4 hours, a deposited white precipitate was recovered by filtration. Subsequently, the precipitate was washed with methanol containing a small amount of acetic acid and with methanol in this order and then dried to obtain poly(2,6-dimethylphenylene-1,4-ether), yield 97%, $\eta_{sp/c}$ 0.80. The amount of diphenoquinone in the polymer was 30 p.p.m.

Examples 24–27

Example 23 was repeated, except that each of the 2,6-disubstituted phenols shown in Table 3 was used in place of the 2,6-dimethylphenol. The results obtained were as summarized in Table 3.

TABLE 3

| Example | 2,6-disubstituted phenol | Yield, percent | $\eta_{sp/c}$ | Diphenoquinone (p.p.m.) |
|---|---|---|---|---|
| 24 | 2,6-diethylphenol | 95 | 0.92 | 50 |
| 25 | 2-methyl-6-chlorophenol | 97 | 0.49 | 50 |
| 26 | 2.methyl.6.n.propylphenol | 98 | 0.78 | 30 |
| 27 | 2-methyl-6-n-butylphenol | 97 | 0.90 | 60 |

Examples 28–32

Example 20 was repeated, except that the amine compound was replaced by each of the amine compounds shown in Table 4. The yields and intrinsic viscosities $\eta_{sp/c}$ of the resulting polymers and the amounts of by-produced diphenoquinone were as summarized in Table 4.

TABLE 4

| Example | Amino compound | Yield, percent | $\eta_{sp/c}$ | Diphenoquinone (p.p.m.) |
|---|---|---|---|---|
| 28 | N,N-dimethyl triethylenetetramine. | 98 | 0.73 | 40 |
| 29 | N,N,-dimethyl-N'-(β-hydroxyethyl) triethylenetetramine. | 98 | 0.69 | 30 |
| 30 | N,N-dimethyl-N'-(γ-aminopropyl) trimethylenediamine. | 98 | 0.70 | 30 |
| 31 | N,N-Dimethyl-N'-(β-hydroxypropyl) ethylenediamine. | 98 | 0.65 | 30 |
| 32 | N-n-Propyl-N',N'-bis (β-hydroxyethyl) ethylenediamine. | 97 | 0.88 | 30 |

Example 33

0.5 Part of manganese nitrate (II) and 3.0 parts of N-(β-hydroxyethyl)diethylenetriamine were dissolved in 90 parts of n-propanol, and the resulting solution was vigorously stirred while flowing oxygen gas into the solution. To this solution was added a solution of 60 parts of 2,6-dimethylphenol in 130 parts of mixed xylenes. When the stirring was continued, the mixed solution reacted with generation of heat and, within about 40 minutes, a polymer came to deposit as a precipitate. After continuing the reaction for 3 hours, the precipitate was recovered by filtration and thoroughly washed with methanol containing a small amount of hydrochloric acid and with methanol in this order to obtain poly(2,6 - dimethylphenylene-1,4-ether), yield 98%, $\eta_{sp/c}$ 0.88. The amount of diphenoquinone in the polymer was 20 p.p.m.

Example 34

The same reaction as in Example 33 was effected, except that 0.5 part of manganese phosphate (II) was used in place of the manganese nitrate (II). After continuing the reaction for 4 hours, the same after-treatment as in Example 18 was carried out to obtain poly(2,6-dimethylphenylene-1,4-ether), yield 97%, $\eta_{sp/c}$ 0.50. The content of diphenoquinone in the polymer was 30 p.p.m.

Example 35

The same reaction as in Example 33 was effected, except that 0.7 part of manganese benzoate (II) was used in place of the manganese nitrate (II). After continuing the reaction for 3 hours, the same after-treatment as in Example 33 was carried out to obtain poly(2,6-dimethylphenylene-1,4-ether), yield 98%, $\eta_{sp/c}$ 0.55. The amount of diphenoquinone in the polymer was 20 p.p.m.

Example 36

The same reaction as in Example 33 was effected, except that 0.4 part of manganese chloride (II) was used in place of the manganese nitrate (II). After continuing the reaction for 3 hours, the same after-treatment as in Example 33 was carried out to obtain poly(2,6-dimethylphenylene-1,4-ether), yield 95%, $\eta_{sp/c}$ 0.79. The amount of diphenoquinone in the polymer was 40 p.p.m.

Example 37

0.1 Part of manganese acetate (II) and 2.5 parts of diethylenetriamine were dissolved in 100 parts of n-butanol, and the resulting solution was vigorously stirred while flowing oxygen gas into the solution. To this solution was added a solution of 60 parts of 2,6-dimethylphenol in 150 parts of toluene. When the stirring was continued, the mixed solution reacted with generation of heat and, after about 40 minutes, a polymer deposited as a white precipitate. After continuing the reaction for 3 hours, the deposited white precipitate was recovered by filtration. Subsequently, the precipitate was washed with methanol containing a small amount of hydrochloric acid and with methanol in this order, and then dried to obtain poly(2,6-dimehylphenylene-1,4-ether), yield 96%, $\eta_{sp/c}$ 0.58. The amount of diphenoquinone in the polymer was 20 p.p.m.

Example 38

Example 37 was repeated, except that 3.0 parts of triethylenetetramine was used in place of the diethylenetriamine, to obtain poly(2,6-dimethylphenylene-1,4-ether), yield 96%, $\eta_{sp/c}$ 0.70. The amount of diphenoquinone in the polymer was 30 p.p.m.

Example 39

The same reaction as in Example 37 was effected, except that 3.5 parts of N-(β-hydroxypropyl)diethylenetriamine was used in place of the diethylenetriamine. After continuing the reaction for 4 hours, the same after-treatment as in Example 37 was carried out to obtain poly(2,6-dimethylphenylene-1,4-ether), yield 98%, $\eta_{sp/c}$ 0.89. The amount of diphenoquinone in the polymer was 50 p.p.m.

Example 40

The same reaction as in Example 37 was effected, except that 3.0 parts of N-(γ-aminopropyl)trimethylenediamine was used in place of the diethylenetriamine. After continuing the reaction for 4 hours, the same after-treatment as in Example 37 was carried out to obtain poly(2,6-dimethylphenylene-1,4-ether), yield 95%, $\eta_{sp/c}$ 0.72. The amount of diphenoquinone in the polymer was 40 p.p.m.

Example 41

The same reaction as in Example 37 was effected, except that 3.5 parts of N-(β-hydroxyethyl)triethylenetetramine was used in place of the diethylenetriamine. After continuing the reaction for 2.5 hours, the same after-treatment as in Example 37 was carried out to obtain poly(2,6-dimethylphenylene-1,4-ether), yield 95%, $n_{sp/c}$ 0.95. The amount of diphenoquinone in the polymer was 50 p.p.m.

Examples 42–45

Example 33 was repeated, except that each of the phenols shown in Table 5 was used in place of the 2,6-dimethylphenol. The results obtained were as summarized in Table 5.

TABLE 5

| Example | Phenol | Yield, percent | $\eta_{sp/c}$ | Diphenoquinone (p.p.m.) |
|---|---|---|---|---|
| 42 | 2,6-diethylphenol | 96 | 0.84 | 50 |
| 43 | 2-methyl-6-bromophenol | 98 | 0.51 | 50 |
| 44 | 2,6-di-n-propylphenol | 94 | 0.66 | 30 |
| 45 | 2-ethyl-6-n-butylphenol | 94 | 0.83 | 60 |

Comparative Example 1

1.2 Parts of cuprous chloride and 40 parts of pyridine were dissolved in 40 parts of methanol to form a homogeneous solution, and oxygen gas was continuously flowed into the solution with vigorous stirring. To this solution was added at a time a solution of 30 parts of 2,6-dimethylphenol in 80 parts of benzene, and the mixed solution was subjected to oxidative polymerization. After 3 hours, a pale yellow polymer precipitate and red diphenoquinone particles were deposited. The precipitate and particles were recovered by filtration, washed and dried to obtain a solid, yield 92%, $\eta_{sp/c}$ 0.59. The amount of diphenoquinone in the solid was 53,000 p.p.m.

Comparative Example 2

80 Parts of pyridine, 40 parts of manganese (III) acetylacetonate and 550 parts of choloroform were sufficiently stirred to form a homogeneous solution, and oxygen gas was continuously flowed into the solution with vigorous stirring. Into this solution was dropped over a period of 60 minutes a solution of 15 parts of 2,6-dimethylphenol in 60 parts of chloroform, and the mixed solution was subjected to oxidative polymerization for 60 minutes. Subsequently, the reaction liquid was cooled in a water bath, and a deposited solid was separated by filtration. The solid was diphenoquinone and amounted to 2.5% based on 2,6-dimethylphenol. The filtrate was charged into 1,200 parts of methanol containing a small amount of hydrochloric acid to deposit the reaction product, which was then washed and dried to obtain a polymer, yield 95%, $\eta_{sp/c}$ 0.95. The amount of diphenoquinone in the polymer was 12,000 p.p.m.

What we claim is:

1. A process for producing aromatic polyethers by polymerizing a 2,6-disubstituted phenol selected from the group consisting of:

2,6-dimethylphenol, 2-methyl-6-ethylphenol,
2,6-diethylphenol, 2-methyl-6-n-propylphenol,
2-methyl-6-chlorophenol, 2-methyl-6-bromophenol,
2-methyl-6-isopropylphenol, 2-ethyl-6-n-propylphenol,
2-methyl-6-n-butylphenol, 2,6-di-n-propylphenol,
2-ethyl-6-chlorophenol, 2,6-di-n-butylphenol,
2-n-butyl-6-chlorophenol, 2-n-propyl-6-chlorophenol under the flow of molecular oxygen containing gas at a temperature from 0° to 100° C. in a solvent, which comprises conducting the polymerization in the presence of a catalyst which is a chelate compound formed from at least one divalent manganese salt and at least an equimolar quantity of at least one amine having the following formula I:

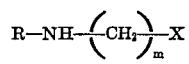

wherein R is an alkyl group having 1 to 4 carbon atoms, a hydroxymethyl group, a β-hydroxyethyl group, a β-hydroxypropyl group or a β-hydroxybutyl group; X is a hydroxyl group, an amino group, an alkylamino group having 1 to 4 carbon atoms, a hydroxymethylamino group, a β-hydroxyethylamino group, a β-hydroxypropylamino group or a β-hydroxybutylamino group; and n is 2 or 3 or the following formula II:

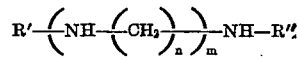

wherein R' and R", are same or different and are individually a hydrogen atom, or R defined above; and n and m are individually 2 or 3; or the following formula III:

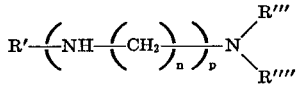

wherein R' is the same as defined above and R''' and R'''' may be same or different and are the same as R defined above; n is 2 or 3; and p is 1, 2 or 3.

2. A process according to Claim 1 wherein the manganese salt is used in an amount of 0.01 to 10 mole percent based on the 2,6-disubstituted phenol.

3. A process according to Claim 1 wherein the manganese salt amounts to 0.05 to 5 mole percent based on 2,6-disubstituted phenol and the amine from 2 to 60 times as much as the mole of the manganese salt.

4. A process according to Claim1 wherein the temperature is from 20° to 70° C.

5. A process according to Claim 1 wherein the manganese salt is inorganic.

6. A process according to Claim 1 wherein the manganese salt is organic.

7. A process according to Claim 1 wherein the solvent is a mixture containing at least one aromatic or halogenated aromatic hydrocarbon together with at least one lower alcohol.

8. A process for producing aromatic polyethers by polymerizing a 2,6-disubstituted phenol selected from the group consisting of:

2,6-dimethylphenol, 2-methyl-6-ethylphenol,
2,6-diethylphenol, 2-methyl-6-n-propylphenol,
2-methyl-6-chlorophenol, 2-methyl-6-bromophenol,
2-methyl-6-isopropylphenol, 2-ethyl-6-n-propylphenol,
2-methyl-6-n-butylphenol, 2,6-di-n-propylphenol,
2-ethyl-6-chlorophenol, 2,6-di-n-butylphenol,
2-n-butyl-6-chlorophenol, 2-n-propyl-6-chlorophenol under the flow of molecular oxygen containing gas at a temperature from 0° to 100° C. in a solvent, which comprises conducting the polymerization in the presence of a catalyst which is a chelate compound formed from at least one divalent manganese salt and at least an equimolar quantity of an amine having the following formula I:

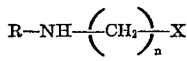

wherein R is an alkyl group having 1 to 4 carbon atoms, a hydroxymethyl group, a β-hydroxyethyl group, a β-hydroxypropyl group or a β-hydroxybutyl group; X is a hydroxyl group, an amino group, an alkylamino group having 1 to 4 carbon atoms, a hydroxymethylamino group, a β-hydroxyethylamino group, a β-hydroxypropylamino group or a β-hydroxybutylamino group; and n is 2 or 3.

9. A process according to Claim 8 wherein the manganese salt is used in an amount of 0.01 to 10 mole percent based on the 2,6-disubstituted phenol.

10. A process according to Claim 8 wherein the manganese salt amounts to 0.05 to 5 mole percent based on 2,6-disubstituted phenol and the amine from 2 to 60 times as much as the mole of the manganese salt.

11. A process according to Claim 8 wherein the temperature is from 20° to 70° C.

12. A process according to Claim 8 wherein the manganese salt is inorganic.

13. A process according to Claim 8 wherein the manganese salt is organic.

14. A process according to Claim 8 wherein the solvent is a mixture containing at least one aromatic or halogenated aromatic hydrocarbon together with at least one lower alcohol.

15. A process for producing aromatic polyethers by polymerizing a 2,6-disubstituted phenol selected from the group consisting of:

2,6-dimethylphenol, 2-methyl-6-ethylphenol,
2,6-diethylphenol, 2-methyl-6-n-propylphenol,
2-methyl-6-chlorophenol, 2-methyl-6-bromophenol,
2-methyl-6-isopropylphenol, 2-ethyl-6-n-propylphenol,
2-methyl-6-n-butylphenol, 2,6-di-n-propylphenol,
2-ethyl-6-chlorophenol, 2,6-di-n-butylphenol,
2-n-butyl-6-chlorophenol, 2-n-propyl-6-chlorophenol under the flow of molecular oxygen containing gas at a temperature from 0° to 100° C. in a solvent, which comprises conducting the polymerization in the presence of a catalyst which is a chelate compound formed from at least one divalent manganese salt and at least an equimolar quantity of an amine having the following formula II:

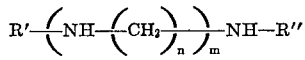

wherein R' and R", are the same or different and are individually a hydrogen atom, an alkyl group having 1 to 4 carbon atoms, a hydroxymethyl group, a β-hydroxyethyl group, a β-hydroxypropyl group or a β-hydroxybutyl group: and n and m are individually 2 or 3.

16. A process according to Claim 22 wherein the manganese salt is used in an amount of 0.01 to 10 mole percent based on the 2,6-disubstituted phenol.

17. A process according to Claim 22 wherein the manganese salt amounts to 0.05 to 5 mole percent based on 2,6-disubstituted phenol and the amine from 2 to 60 times as much as the mole of the manganese salt.

18. A process according to Claim 22 wherein the temperature is from 20° to 70° C.

19. A process according to Claim 22, wherein the manganese salt is inorganic.

20. A process according to Claim 22 wherein the manganese salt is organic.

21. A process according to Claim 22 wherein the solvent is a mixture containing at least one aromatic or halogenated aromatic hydrocarbon together with at least one lower alcohol.

22. A process for producing aromatic polyethers by polymerizing a 2,6-disubstituted phenol selected from the group consisting of:

2,6-dimethylphenol, 2-methyl-6-ethylphenol,
2,6-diethylphenol, 2-methyl-6-n-propylphenol,
2-methyl-6-chlorophenol, 2-methyl-6-bromophenol,
2-methyl-6-isopropylphenol, 2-ethyl-6-n-propylphenol,
2-methyl-6-n-butylphenol, 2,6-di-n-propylphenol,
2-ethyl-6-chlorophenol, 2,6-di-n-butylphenol,
2-n-butyl-6-chlorophenol, 2-n-propyl-6-chlorophenol under the flow of molecular oxygen containing gas at a temperature from 0° to 100° C. in a solvent, which comprises conducting the polymerization in the presence of a catalyst which is a chelate compound formed from at least one divalent manganese salt and at least an equimolar quantity of an amine having the following formula III:

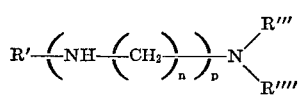

wherein R''' and R'''' may be the same or different and are an alkyl group having 1 to 4 carbon atoms, a hydroxymethyl group, a β-hydroxyethyl group, a β-hydroxypropyl group, or a β-hydroxybutyl group and R' is the same as R''' and R'''' or a hydrogen atom; n is 2 or 3; and p is 1, 2 or 3.

23. A process according to Claim 22, wherein the manganese salt is used in an amount of 0.01 to 10 mole percent based on the 2,6-disubstituted phenol.

24. A process according to Claim 22 wherein the manganese salt amounts to 0.05 to 5 mole percent based on 2,6-disubstituted phenol and the amine from 2 to 60 times as much as the mole of the manganese salt.

25. A process according to Claim 22 wherein the temperature is from 20° to 70° C.

26. A process according to Claim 22 wherein the manganese salt is inorganic.

27. A process according to Claim 22 wherein the manganese salt is organic.

28. A process according to Claim 22 wherein the solvent is a mixture containing at least one aromatic or halogenated aromatic hydrocarbon together with at least one lower alcohol.

References Cited

UNITED STATES PATENTS 3,337,501    8/1967    Bussink et al.
3,573,257    3/1971    Nakashio et al.

FOREIGN PATENTS 1,560,562    3/1969    France.

MELVIN GOLDSTEIN, Primary Examiner